F. NACE.
ANTISLIPPING OR ANTISKIDDING DEVICE FOR WHEELED VEHICLES.
APPLICATION FILED FEB. 25, 1915.
1,192,673. Patented July 25, 1916.
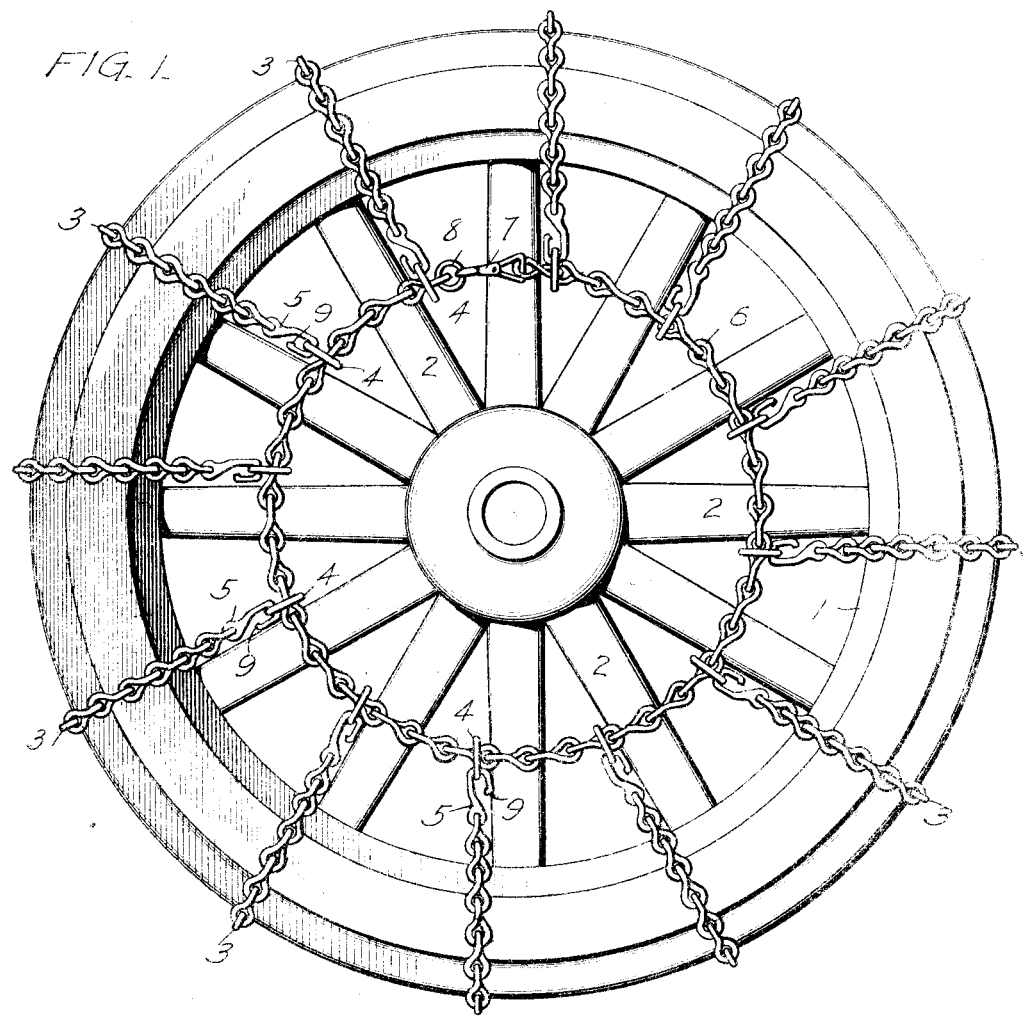
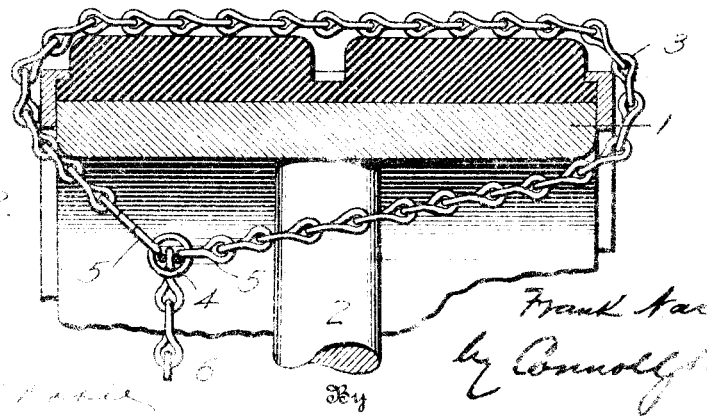

UNITED STATES PATENT OFFICE.

FRANK NACE, OF TRENTON, NEW JERSEY.

ANTISLIPPING OR ANTISKIDDING DEVICE FOR WHEELED VEHICLES.

1,192,673.  Specification of Letters Patent.  Patented July 25, 1916.

Application filed February 23, 1915. Serial No. 10,562.

*To all whom it may concern:*

Be it known that I, FRANK NACE, a citizen of the United States, residing at Trenton, in the county of Mercer and State of New Jersey, have invented certain new and useful Improvements in Antislipping or Antiskidding Devices for Wheeled Vehicles, of which the following is a specification, reference being had therein to the accompanying drawing.

This invention has relation to anti slipping or anti skidding devices for motor vehicles and especially for heavy motor trucks, and has for its object the provision of a novel construction and arrangement of antiskidding chains to be applied to the felly of the motor wheels so as to prevent slipping or side skidding of the same.

A frequent and dangerous occurrence with safety or anti-skidding chains of the present construction and arrangement is the rupture of the links or connections and the entangling of the loose chain in the drive gearing resulting in the stoppage of the vehicle and the breakage or serious disarrangement of the driving gear.

The principal object of the present invention is to provide against such disastrous results by so constructing and applying the chains, that in case of rupture of the links or connections, the loose sections will be thrown outward of the spokes and rim instead of inward, and will thus avoid entanglement with any of the driving connections.

In carrying my invention into effect, I provide a number of short chains to loop around or encircle the tire and fellies of the wheels, between the spokes, and I provide each such chain with a ring on one end, and a hook or similar device at the other end, so that the ends may be detachably connected together. I also provide and use another chain which is located between the hub and the rim of the wheel and has its ends connected together by a hook or other suitable detachable coupling, so as to form a large loop or safety chain which is located outside of the spokes. This safety chain is passed through the rings of the outer or rim embracing chains, and is supported thereby. This safety chain may be constructed of either straight link or twist link chains, wire rope, or any other mechanism suitable to obtain the same basic results. The short chains looped around the fellies and rim constitute the anti-slipping or anti-skidding elements of the structure. In the event of any of these chains breaking, or being disconnected from the safety chain, the former will be caused to fall outward by reason of the strain exerted on the same by the large safety chain, and its free end will drop at a point outside the wheel and wholly away from the driving gear or any other part of the vehicle which might be injured or affected by its contact or presence.

Another improvement or advantage of this safety chain is the ease with which it can be adjusted to take up the slack of cross chains caused by the wearing in use.

My invention consists in the construction and combination of parts constituting a safety device for motor vehicle wheels, as hereinafter described and claimed.

In the accompanying drawing: Figure 1, is a side view of a motor vehicle wheel, with the safety device applied thereto. Fig. 2, is a transverse sectional view of the same.

I have shown the safety device as applied to a truck wheel having twin solid tires, but it may be applied to other forms of wheels and to the spoked wheels of any vehicle.

In the accompanying drawing 1, designates the fellies or rim of a wheel having spokes 2, and 3 designates a series of short chains, adapted to serve as anti-slipping or anti-skidding chains. These chains are looped around the fellies and tire of the wheel and are provided, each with a ring 4, on one end and a hook, 5, on the other end, by which the ends are coupled together between the spokes 2.

6 designates a chain having on one end a hook 7, and on the other end a ring 8, by which the ends are coupled together to form a chain ring which is passed through the rings 4, and supports the chains 3. The chain 6, is of such a length that in its ring form it will be under a sufficient degree of tension to maintain the chains 3, in proper relative position, while allowing the chains 3 to move on the fellies under friction with the ground and slightly drag, in accordance with the requirements of an effective anti-slipping or anti-skidding chain. The ring chain 6, is located on the outside of the wheel.

Now in the event of the rupture or breaking of a chain 3, at any point, its loose end or ends, by reason of being coupled to the chain 6, will be drawn outwardly and instead of falling down on the inner side of the wheel, will fall outside or immediately below the point of connection with the chain 6, and thus avoid contact or entanglement with the driving gear on the inside of the wheel.

The links of the cross chains are preferably of a twisted oval shape, so as to produce what is known as a round chain, and are adapted to roll under friction so as to avoid unequal wear and increase their anti-slipping quality.

The hook 5, of the chain 3, has a substantially rectangular hook recess, the opening to which is contracted by an inwardly extending projection 9, which partially obstructs the passage of the ring 4, and thus prevents accidental disconnection of the ring 4, from the hook 5.

When cross chains 3, become worn near breaking point, if chains are reversed, double service will be thereby obtained. By carrying extra cross chains, 3, any unskilled person can make immediate repairs without any difficulty.

I claim:—

1. The combination with a wheel, of an anti-skidding device comprising a plurality of radial chains encircling the rim of the wheel and a flexible floating ring to which all of said radial chains are solely attached.

2. In an anti-skidding chain device for wheels, the combination of a series of chains adapted to encircle the rim and tire, each having a ring on one end and a hook on the other, the rings being adapted to be engaged with a ring safety chain having detachable ends, said ring safety chain being adapted to pass through the rings carried by the felly and tire encircling chains.

3. An anti-skidding device comprising a series of independent chains encircling the rim of a wheel, and a ring on the outer side of the wheel to which all of the chains are slidably connected.

4. A traction device for a vehicle wheel, comprising a plurality of radially arranged chains, and a floating ring connecting the same and directly connected to both ends of each of the chains.

In testimony whereof I affix my signature in presence of two witnesses.

FRANK NACE.

Witnesses:
EDWARD HILAND,
CHAS. HOWARD GIBBS.